US006956866B1

(12) United States Patent
Li et al.

(10) Patent No.: US 6,956,866 B1
(45) Date of Patent: Oct. 18, 2005

(54) METHOD AND APPARATUS FOR COLLECTING STATISTICS FROM ELEMENTS AT MULTIPLE COLLECTION RATES

(75) Inventors: Weidong Li, Saratoga, CA (US); Sanjeev S. Ukhalkar, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 946 days.

(21) Appl. No.: 09/864,101

(22) Filed: May 23, 2001

(51) Int. Cl.$^7$ .............................................. H04L 12/56
(52) U.S. Cl. ...................................... 370/449; 709/224
(58) Field of Search ................................ 370/412, 415, 370/230; 709/224, 223

(56) References Cited

U.S. PATENT DOCUMENTS

| | | | |
|---|---|---|---|
| 4,733,390 A | | 3/1988 | Shirakawa et al. |
| 5,463,620 A | * | 10/1995 | Sriram ........................ 370/412 |
| 5,953,338 A | * | 9/1999 | Ma et al. ................ 370/395.21 |
| 6,067,301 A | * | 5/2000 | Aatresh ...................... 370/418 |
| 6,678,248 B1 | * | 1/2004 | Haddock et al. ............ 370/235 |
| 6,856,257 B1 | * | 2/2005 | Van Heteren .......... 340/870.03 |

OTHER PUBLICATIONS

Shah et al., "Maintaining Statistics Counters in Router Line Cards," IEEE Micro Jan.-Feb. 2002, pp. 76-81.

\* cited by examiner

*Primary Examiner*—Kenneth Vanderpuye
(74) *Attorney, Agent, or Firm*—The Law Office of Kirk D. Williams

(57) ABSTRACT

Methods and apparatus are disclosed for collecting statistics from elements at multiple collection rates which may be used, inter alia, in a computer or communications system, such as a computer or communications device, packet switching system, router, other device, or component thereof. Multiple polling tasks running at different polling intervals are used to collect data from various sets of elements. Elements are assigned to a polling task or group based on a required minimum collection rate for the element, which may correspond to a data acquisition or overflow rate for the element. In one implementation, this data corresponds to traffic and other characteristics of a connection, such as a virtual connection across a packet switching system or device.

21 Claims, 7 Drawing Sheets

METHOD AND APPARATUS FOR COLLECTING STATISTICS FROM ELEMENTS AT MULTIPLE COLLECTION RATES

FIELD OF THE INVENTION

This invention relates to collecting communications statistics at multiple rates corresponding to overflow rates of statistic accumulators; and more particularly, the invention relates to collecting packet statistics from elements of a packet switching device at rates corresponding to accumulation and overflow rates.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

In most any communications network, statistics collection is a very important function. For example, various statistics are collected for billing, performance monitoring, and for other engineering purposes. In certain packet switching systems, statistics are collected on each virtual connection. Counting mechanisms, such as hardware registers and counters, may be used to accumulate these statistics, which may be then collected by one or more collection devices. In known systems, a collection device sequences through each counting mechanism in a round robin fashion. The rate of this collection cycle must greater than the fastest overflow rate of one of the counting mechanisms. Otherwise, data will be lost.

However, the number of connections supported by a packet switching system continues to increase, and the data rate supported by a connection continues to increase. Therefore, the number of statistics which must be collected continue to increase as does the rate at which each statistic must be collected before a data loss occurs because of an overflow condition. In certain systems, too many resources are required for statistics collection, and in certain circumstances, the collection device cannot sequence through the collection cycle fast enough to avoid data loss. Needed are new methods and apparatus for collecting these statistics.

SUMMARY OF THE INVENTION

Systems and methods are disclosed for collecting statistics from elements at multiple collection rates. One embodiment establishes a plurality of collection pools for a range of collection rates, each of the plurality of collection pools has a different collection rate. A connection is assigned to a particular one of the plurality of collection pools. Data is collected for the connection at approximately the collection rate of said particular one of the plurality of collection pools.

In one embodiment, an apparatus includes multiple counting elements, where each of the multiple counting elements typically maintains different packet statistic counts for multiple connections. Each connection or element has an associated required minimum collection rate. A data structure is used to indicate an assignment of each of the connections or elements to one of multiple collection groups, with each of the multiple collection groups having a different collection rate. The connections or elements are assigned to a collection group so that a particular collection rate of a particular collection group exceeds the minimum collection rates of any of the plurality of connections or elements assigned to the particular collection group. A collector then acquires data for the plurality of connections or from the plurality of elements according to the different collection rates of the collection groups.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
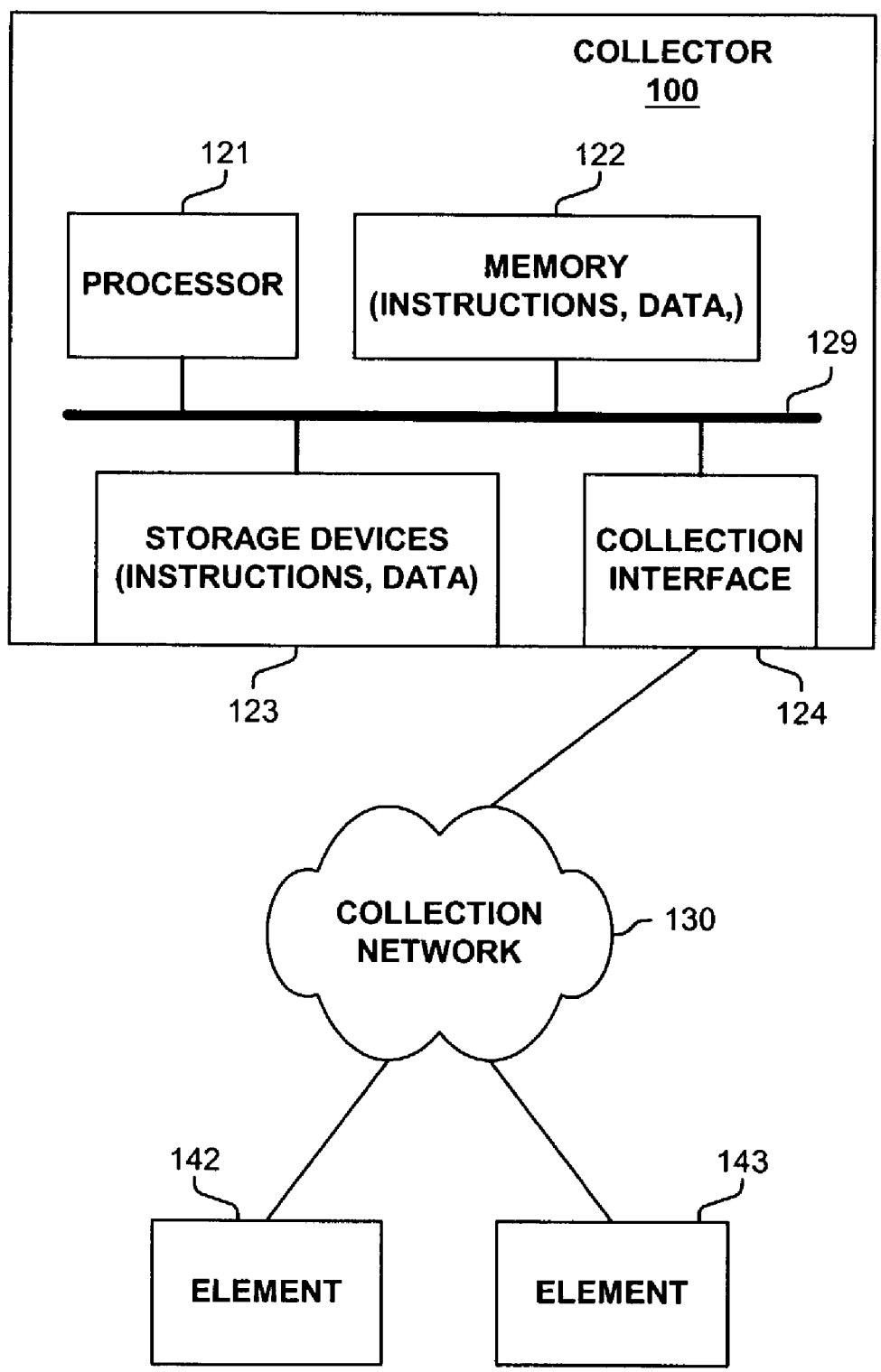
FIG. 1A is a block diagram illustrating a collector, collection network, and elements.

Methods and apparatus are disclosed for collecting statistics from elements at multiple collection rates which may be used, inter alia, in a computer or communications system, such as a computer or communications device, packet switching system, router, other device, or component thereof. Such methods and apparatus are not limited to a single computer or communications system. Rather, the architecture and functionality taught herein are extensible to an unlimited number of computer and communications systems, devices and embodiments in keeping with the scope and spirit of the invention. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, integrated circuit chips, embedded processors, ASICs, methods, and computer-readable medium containing instructions. The embodiments described hereinafter embody various aspects and configurations within the scope and spirit of the invention.

Methods and apparatus are disclosed for collecting statistics from elements at multiple collection rates which may be used, inter alia, in a computer or communications system, such as a computer or communications device, packet switching system, router, other device, or component thereof. Multiple polling tasks running at different polling intervals are used to collect data from various sets of elements. Connections are assigned to a polling task or group based on a required minimum collection rate for the particular connection, which may correspond to a data acquisition or overflow rate for the connection. In one embodiment, this data corresponds to traffic and other characteristics of a connection, such as a virtual connection across a packet switching system or device.

As used herein, the term "packet" refers to packets of all types, including, but not limited to, fixed length cells and variable length packets, each of which may or may not be divisible into smaller packets or cells. Moreover, these packets may contain one or more types of information, including, but not limited to, voice, data, video, and audio information. Furthermore, the term "system" is used generically herein to describe any number of components, elements, sub-systems, devices, packet switch elements, packet switches, networks, computer and/or communication devices or mechanisms, or combinations of components thereof. The term "computer" is used generically herein to describe any number of computers, including, but not limited to personal computers, embedded processors, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units.

FIG. 1A illustrates one embodiment of a system for collecting statistics from elements at multiple connection rates. As shown, collector 100 comprises a processor 121, memory 122, storage devices 123, and collection interface 124, which are electrically coupled via one or more communications mechanisms 129 (shown as a bus for illustrative purposes). The operation of collector 100 is typically controlled by processor 121 using memory 122 and storage devices 123. Collector 100 communicates, using collection interface 124, over collection network 130 to multiple elements 142–143 to collect desired data. Memory 122 is one type of computer-readable medium, and typically comprises random access memory (RAM), read only memory (ROM), integrated circuits, and/or other memory components. Memory 122 typically stores computer-executable instructions to be executed by processor 121 and/or data which is manipulated by processor 121 for implementing functionality in accordance with the invention. Storage devices 123 are another type of computer-readable medium, and typically comprise disk drives, diskettes, networked services, tape drives, and other storage devices. Storage devices 123 typically store computer-executable instructions to be executed by processor 121 and/or data which is manipulated by processor 121 for implementing functionality in accordance with the invention.

As used herein and contemplated by the invention, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

Elements 142–143 could be any device, component, counting mechanism (e.g., counter, register, memory, etc.) In one embodiment, data collector 100, collection network 130, and elements 142–143 are implemented as part of a single computer or communications component or device.

Figure 1B:
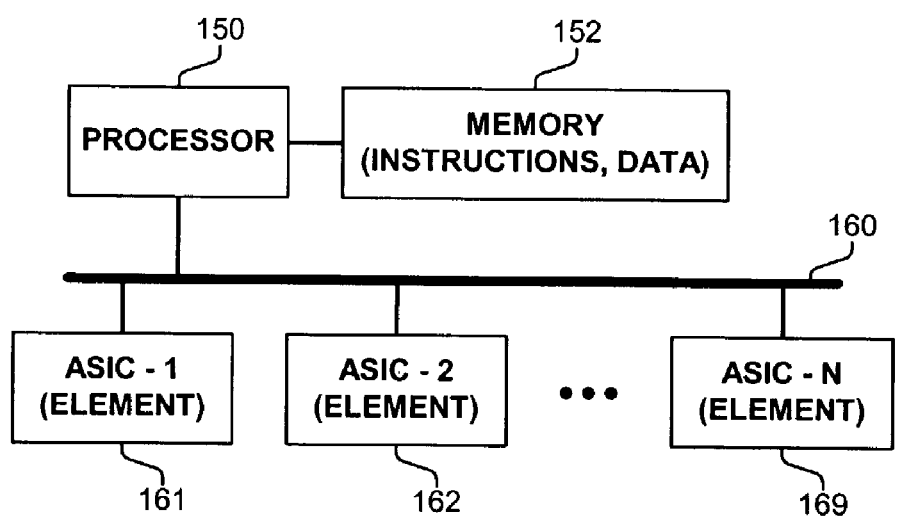
FIG. 1B is a block diagram illustrating a collection processor and application-specific integrated circuit ("ASIC") elements.

FIG. 1B illustrates another embodiment of an apparatus for collecting data from multiple ASIC elements 161–169. Collection processor 150 using memory 152 polls ASIC elements 161–169 at multiple, predetermined polling rates corresponding to the minimum collection rates required by ASIC elements 161–169 to collect data without loosing data due to an overflow condition. Collection processor 150 polls ASIC elements 161–169 and collects data over communications mechanism 160, which is shown for illustrative purposes as a bus.

Figure 2:
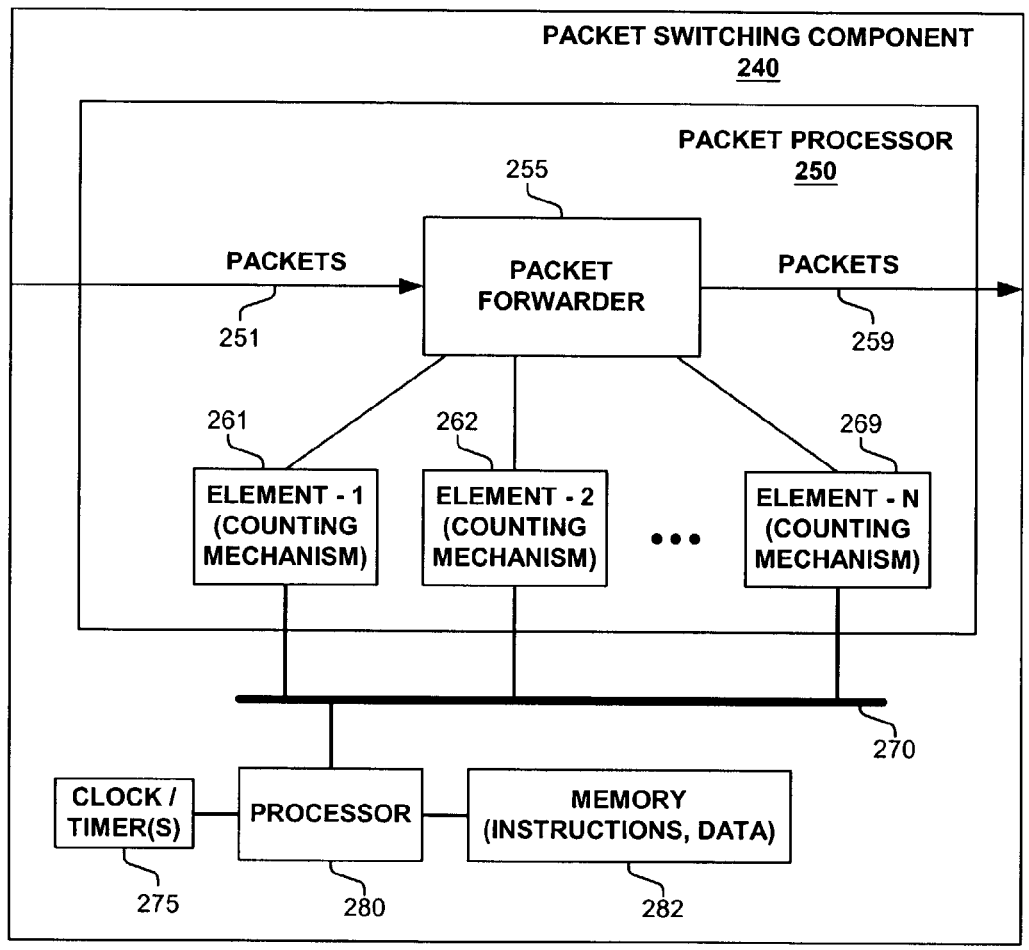
FIG. 2 is a block diagram of a packet switching component including a packet processor with elements maintaining statistics and a collection processor.

FIG. 2 illustrates a packet switch component 240 which collects statistics from elements at multiple collection rates according to the invention. Packet switch component 240 may be located in any part of a packet switching system, including, but not limited to a line card, interface, switching component, etc. Packets are received over link 251, processed by packet forwarder 255, and sent over link 259. Elements 261–269 collect statistics about these packets, such as packet counts, packet errors, quality of service measurements, packet and other rates, thresholds, etc. Elements 261–269 are typically a counting mechanism or data storage mechanism that can accommodate one or more statistics for one or more virtual connections. For example, each of the elements 261–269 may be implemented as, but not limited to one or more counters, registers, or control logic with a bank of counters, registers, or memory. In one embodiment, packet forwarder 255 and elements 261–269 are included in a packet processor 250. In one embodiment, elements 261–269 collect statistics about one or more connections.

As shown, processor 280 collects statistics from elements 261–269 over a data communications mechanism 270 (shown as a bus for illustrative purposes). In one embodiment, processor 280, using memory 282 and one or more inputs from clock or timer signal or interrupt generator 275, collects data at multiple rates from elements 261–269 typically using multiple tasks. Clock or timer signal or interrupt generator 275 typically produces one or more clock or timer signals or interrupts for initiating and/or controlling the operation of these multiple collection tasks/cycles.

In one embodiment for use with synchronous optical network ("SONET") transmission rates, polling intervals are used which conform to the SONET rate hierarchy, including OC-192 (which corresponds to roughly a 10 ms polling interval) to OC-48 (which corresponds to roughly a 40 ms polling interval). For example, one embodiment uses sixteen polling tasks operating at polling intervals of 10 ms, 40 ms, 160 ms, 2520 ms, . . . 655360 ms (approximately 10 minutes). Different embodiments use different numbers and rates of polling intervals, with the number and rate of these polling intervals selected based on the needs of the system and statistics to be collected.

Figure 3:
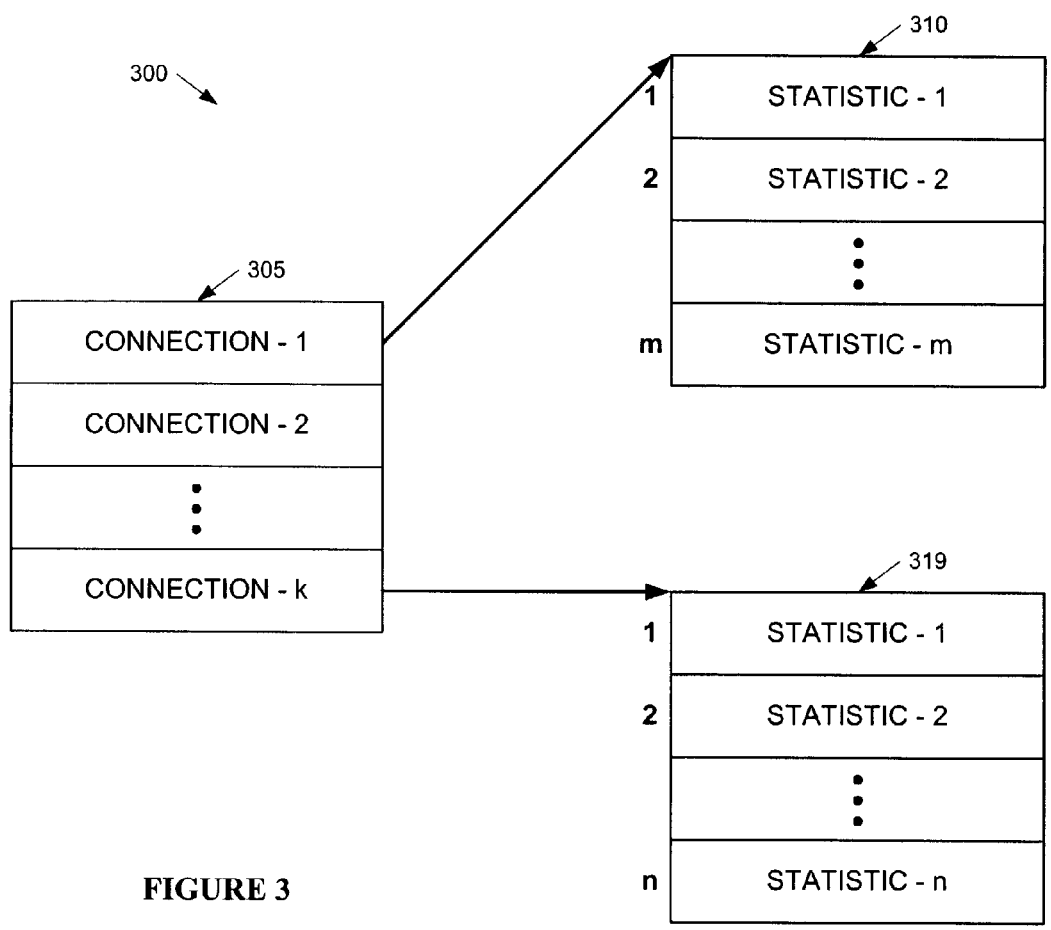
FIG. 3 is a block diagram of one data structure used to collect and/or maintain statistics.

FIG. 3 illustrates one embodiment of a data structure 300 used in one embodiment to collect and/or maintain statistics. For example and referring to FIG. 2, data structure 300 (some variant thereof, or some other data structure) may be maintained by one or more elements 261–269 and/or in memory 282 for use by collection processor 280. Data structure 300 is illustrated as a linked list, although other data structures (e.g., one or more arrays, tables, registers, memory addresses, counters, linked lists of statistics in place of a record, etc.) may be used. As shown in FIG. 3, a statistic record 310–319 is maintained for each of k connections illustrated by data structure element 305. Statistic records 310 typically maintain a single statistic (e.g., a packet count, error count, etc.). The values of k, m, and n are integer values greater than or equal to one (of course if k is one, then there would only be one statistic record 310–319).

In one embodiment, collection group assignment data structure 400 is used to assign a connection to one of the data collection cycles. As shown, data structure 400 is implemented using an array and multiple linked lists, although many other data structures are possible, such as those using one or more arrays, tables, lists, trees, etc. Each collection group 401–409 corresponds to one of the collection cycles, wherein typically at least two of the collection cycles operate at different collection rates.

Figure 5A:
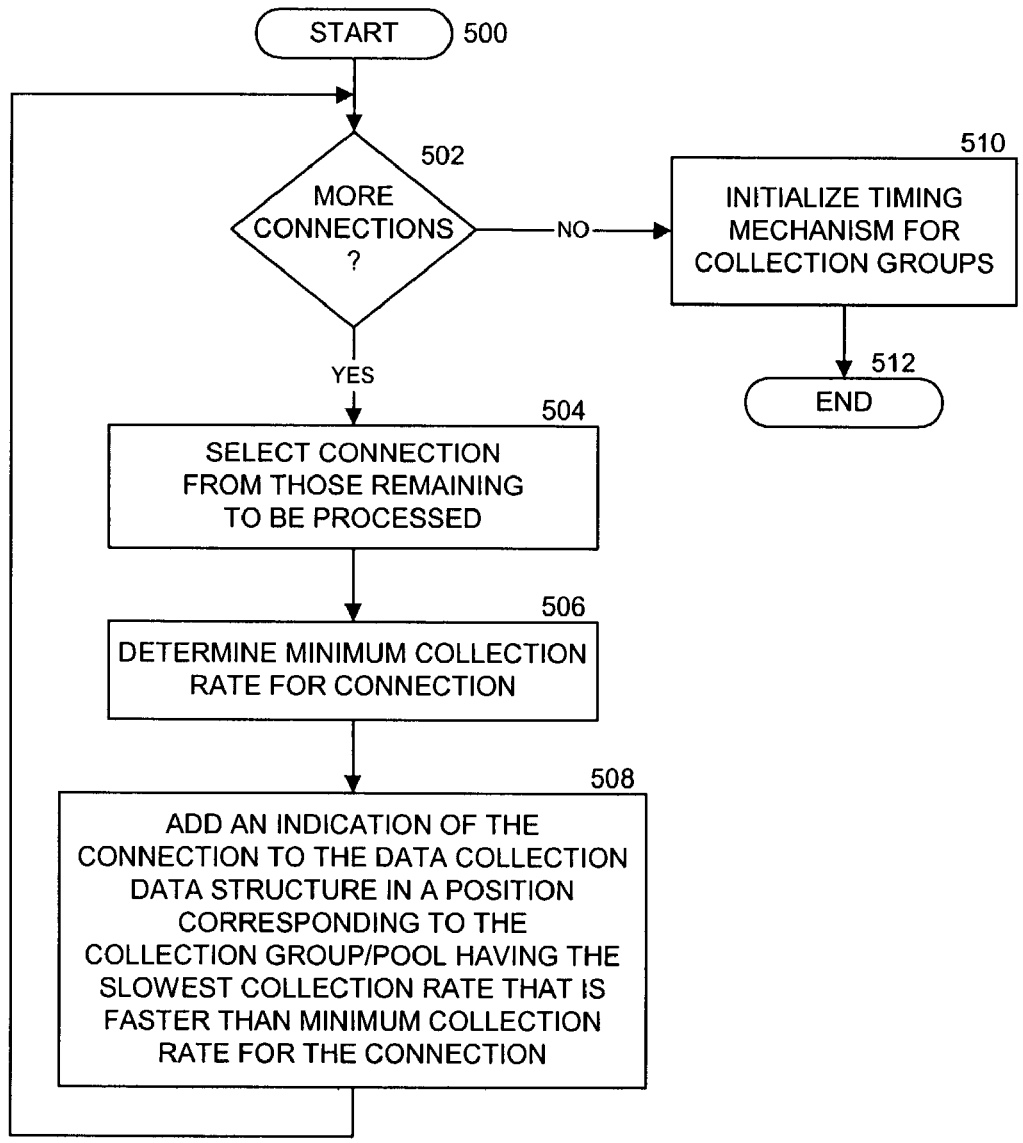
FIG. 5A is flow diagram of a process of one embodiment for assigning connections to a data collection group.

Connections (or elements in one embodiment) are assigned to a collection group 401–409 by placing an indicator 411–499 of a particular connection in the link list corresponding to the appropriate collection group. One operation of this assignment process is further illustrated by the flow diagram of FIG. 5A, to which we now turn.

Figure 4:
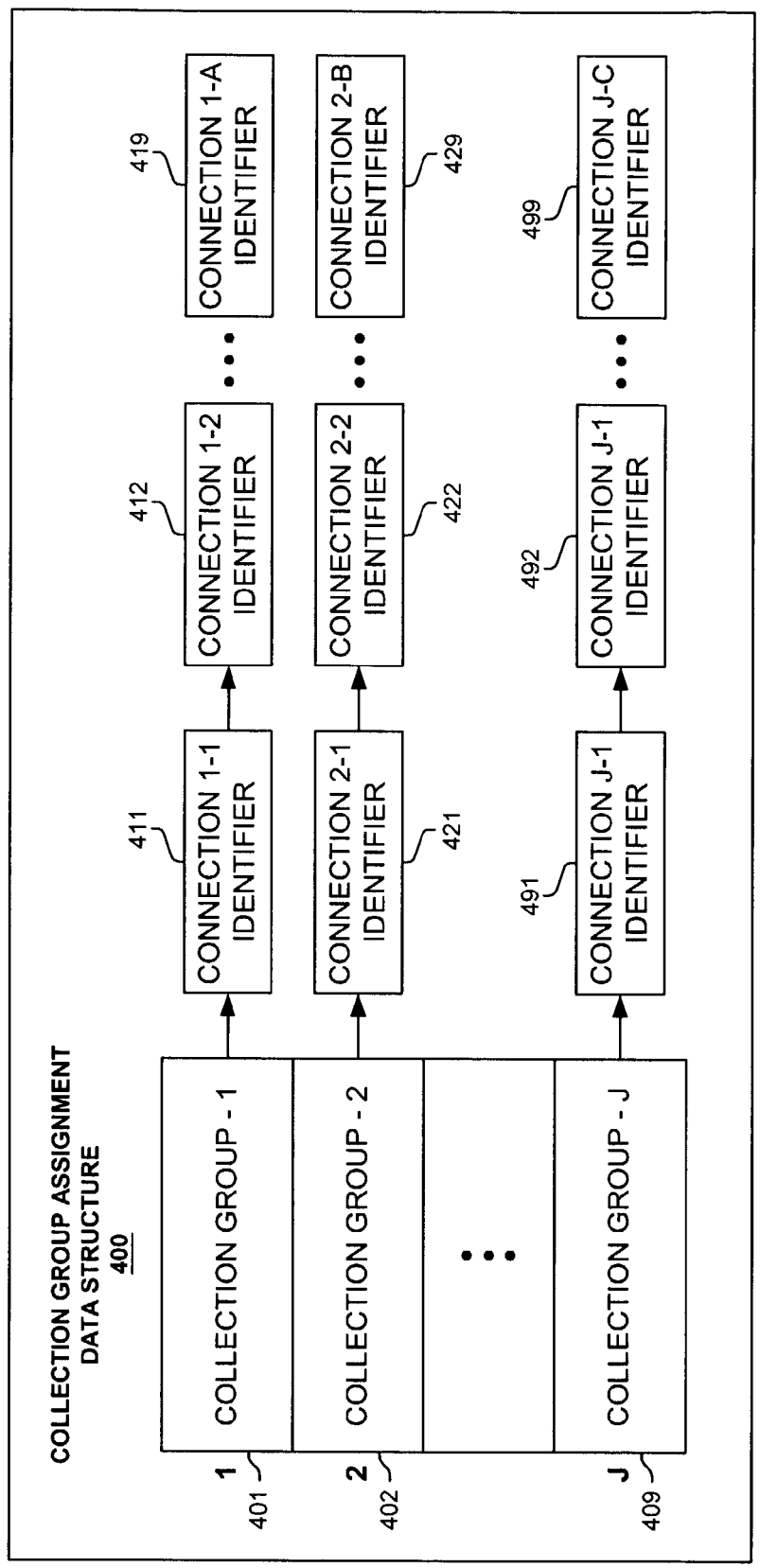
FIG. 4 is a block diagram of one data structure used to maintain collection groups of connection identifiers in one embodiment.

Processing begins at process block 500, and proceeds to process block 502 wherein a determination is made whether there are anymore connections that need to be assigned to a collection group. The process illustrated in FIG. 5 is typically run initially and when new data needs collecting, such as when new virtual circuits are added in a packet switching system. While there are more connections to assign to a collection group, a connection is selected from those remaining to be processed in process block 504, the minimum collection rate for the selected connection is determined in process block 506, and the connection is assigned to a collection pool/group by adding an indicator in a collection data structure (such as data structure 400 illustrated in FIG. 4) for typically the slowest collection group that collects faster than the determined minimum collection rate for the selected connection. When all connections have been assigned to a collection group/pool as determined in process block 502, then the timing mechanisms for each of the collection pools/groups are initialized in process block 510. Processing is complete as indicated by process block 512.

Figure 5B:
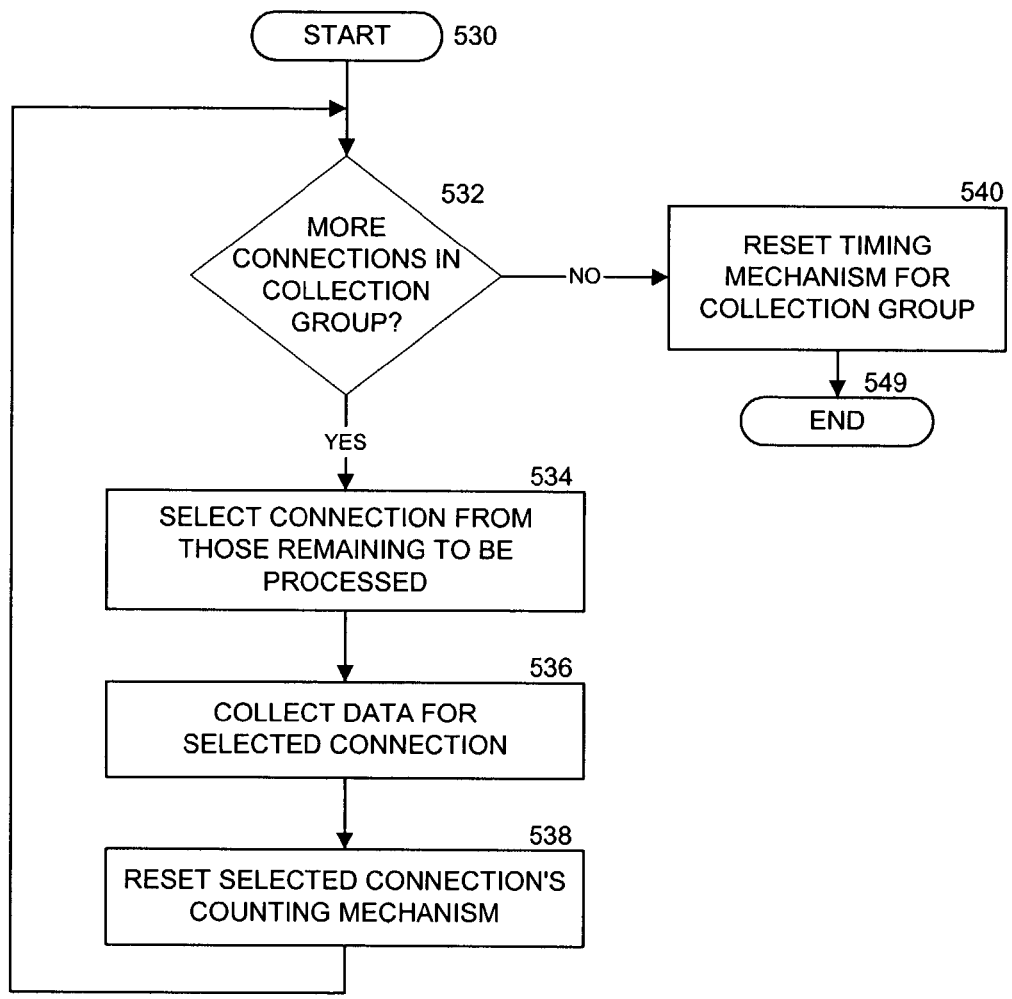
FIG. 5B is a flow diagram of a process of one embodiment for collecting data from connections assigned to a particular collection group.

FIG. 5B illustrates one embodiment of the operation of a collection cycle for a collection group (or pool). Processing begins at process block 530 and proceeds to process block 532. While there are more connections in the collection group to collect data from as determined by process block 532, then one of the connections remaining to be collected, such as the next one in link list of data structure 400 (FIG. 4), is selected in process block 534, data is collected for the selected connection in process block 536, and the counting mechanism for the selected connection is reset in process block 538. When data for all connections of the collection group have been collected as determined in process block 532, then the timing mechanism for the particular collection group is reset in process block 540, and processing is complete as indicated by process block 549.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus comprising:
a plurality of elements, each of the plurality of elements maintaining a different packet statistic count and having a required minimum collection rate;
one or more storage elements for storing a data structure indicating an assignment of each of the plurality of elements to one of a plurality of collection groups each having a different collection rate, wherein a particular collection rate of a particular collection group exceeds the minimum collection rates of any of the plurality of elements assigned to the particular collection group; and
a collector to acquire data from the plurality of elements according to said different collection rates of the plurality of collection groups.

2. The apparatus of claim 1, wherein the different packet statistic count maintained by each of the plurality of elements corresponds to one or more connections.

3. The apparatus of claim 1, wherein each of the plurality of elements includes a counting mechanism.

4. The apparatus of claim 1, further comprising a packet processor coupled to each of the plurality of elements and to initiation modification of said data in the plurality of elements.

5. The apparatus of claim 4, wherein each of the plurality of elements includes a counting mechanism.

6. A packet switching component including the apparatus of claim 1.

7. The apparatus of claim 1, wherein the data structure includes a plurality of identifiers, each of the plurality of identifiers corresponds to a different one of the plurality of elements.

8. The apparatus of claim 7, wherein the data structure includes at least one linked list of a group of the plurality of identifiers assigned to one of the plurality of collection groups.

9. The apparatus of claim 1, wherein the collector includes a second data structure to maintain indications of said data acquired from the plurality of elements.

10. An apparatus comprising:
a plurality of means for maintaining a packet statistic, the plurality of means for maintaining the packet statistic having at least two different minimum collection rates;
means for acquiring data at a plurality of different collection rates from the plurality of means for maintaining the packet statistic; and means for relating each of the plurality of means for maintaining the packet statistic to one of the plurality of collection rates.

11. An apparatus for collecting statistics at multiple collection rates, the apparatus comprising:

means for establishing a plurality of statistics collection pools for a range of statistics collection rates, each of the plurality of statistics collection pools having a different statistics collection rate;

means for collecting statistics data from a plurality of means for storing statistics data;

means for assigning a particular means for storing statistics data to a particular one of the plurality of statistics collection pools based at least in part on a statistics overflow rate for the means for storing statistics data; and means for collecting statistics data from the plurality of means for storing statistics data at approximately said statistics collection rates of the plurality of statistics collection pools.

12. The apparatus of claim 11, wherein the statistics collection rate of each of the plurality of statistics collection pools equals or exceeds the statistics overflow rate for each particular means for storing statistics data assigned to said each of the plurality of statistics collection pools.

13. The apparatus of claim 12, wherein each of the plurality of means for storing statistics data maintains at least one packet statistic.

14. An apparatus for collecting statistics at multiple collection rates, the apparatus comprising:

means for determining a statistics data acquisition rate for each element of a plurality of elements;

means for configuring a plurality of predefined statistics collection groups, each of said predefined collection group having a different predetermined statistics collection rate;

means for assigning said each element to one of the plurality of predefined statistics collection groups based at least in part on the statistics data acquisition rate for said each element; and means for collecting statistics data from said each element according to its assigned predefined statistics collection group at approximately said corresponding predetermined statistics collection rate.

15. The apparatus of claim 14, wherein said predetermined statistics collection rate for a particular predefined collection group exceeds a statistics data overflow rate for each of the elements assigned to said particular predefined statistics collection group.

16. The apparatus of claim 15, wherein each element maintains at least one packet statistic.

17. An apparatus for collecting statistics at multiple collection rates, the apparatus comprising:

means for establishing a plurality of statistics collection pools for a range of collection rates, each of the plurality of statistics collection pools having a different statistics collection rate;

means for assigning a connection to a particular one of the plurality of statistics collection pools; and means for collecting statistics data for the connection at approximately the statistics collection rate of said particular one of the plurality of statistics collection pools.

18. The apparatus of claim 17, wherein the statistics connection is assigned to the particular one of the plurality of statistics connection pools based at least in part on a statistics overflow rate for a collected statistics characteristic of the connection.

19. The apparatus of claim 18, wherein the statistics collection rate of said particular one of the plurality of statistics collection pools equals or exceeds the statistics overflow rate for the collected statistics characteristic of the connection.

20. An apparatus for collecting statistics at multiple collection rates, the apparatus comprising:

means for determining a statistics data acquisition rate for each connection of a plurality of connections;

means for configuring a plurality of predefined statistics collection groups, each of said predefined statistics collection group having a different predetermined statistics collection rate;

means for assigning said each connection to one of the plurality of predefined statistics collection groups based at least in part on the statistics data acquisition rate for said each connection; and means for collecting statistics data for said each connection according to its assigned predefined statistics collection group at approximately said corresponding predetermined statistics collection rate.

21. The apparatus of claim 20, wherein said predetermined collection rate for a particular predefined statistics collection group exceeds a statistics collection data overflow rate for each of the connections assigned to said particular predefined statistics collection group.

\* \* \* \* \*